(12) United States Patent
Lowensohn

(10) Patent No.: US 10,332,426 B2
(45) Date of Patent: Jun. 25, 2019

(54) SELF-ORGANIZING TECHNOLOGY FOR DISASTER RESPONSE AND RECOVERY

(76) Inventor: Brent A. Lowensohn, Encino, CA (US)

(*) Notice: Subject to any disclaimer, the term of this patent is extended or adjusted under 35 U.S.C. 154(b) by 0 days.

(21) Appl. No.: 13/523,504

(22) Filed: Jun. 14, 2012

(65) Prior Publication Data

US 2013/0337430 A1 Dec. 19, 2013

(51) Int. Cl.
*G09B 25/00* (2006.01)

(52) U.S. Cl.
CPC ................... *G09B 25/00* (2013.01)

(58) Field of Classification Search
CPC ......... G09B 19/00; G09B 25/00; B65D 85/00
USPC .......................................... 434/429; 206/223
See application file for complete search history.

(56) References Cited

U.S. PATENT DOCUMENTS

| | | | | |
|---|---|---|---|---|
| 1,291,201 A | * | 1/1919 | Shrum | A45C 13/02 190/110 |
| 5,263,576 A | * | 11/1993 | Boreen | B65D 43/20 206/455 |
| 6,460,702 B2 | * | 10/2002 | Hammond | A61F 17/00 206/425 |
| 7,628,275 B2 | * | 12/2009 | Smith | A62B 99/00 206/232 |
| 2008/0078682 A1 | * | 4/2008 | Clark | A62B 99/00 206/223 |
| 2009/0191363 A1 | * | 7/2009 | Edward | B32B 3/06 428/12 |

OTHER PUBLICATIONS

Pelican-Hardigg (FT3317) Footlocker with Wheels; U.S. Army's Field Manual 10-500-1-Airdrop Support Operations in Theater of Operations (http://www.enlisted.info/field-manuals/fm-10-500-1-airdrop-support-operations-in-a-theater-of-operations-shtml.*
FEMA's Community Emergency Response Team (CERT) / Basic Training Manual (Jan. 2011).*
Pelican-Hardigg (FT3317 Footlocker).*
U.S. Army Field Manual 4-20.41, Aerial Delivery Distribution in the Theater of Operations (Aug. 2003).*
Pelican 1644 Transport Case.pdf / Jun. 21, 2010.*
FEMA's Community Response Emergency Response Team / Basic Training Manual (Jan. 2011).*
U.S. Army's Field Manual 4-20.41 / Aerial Delivery Distribution in the Theater of Operations (Fundamentals of Aerial Delivery Distribution Operations, Chapter 2).*

(Continued)

*Primary Examiner* — Thomas J Hong
(74) *Attorney, Agent, or Firm* — Klein, O'Neill & Singh, LLP

(57) ABSTRACT

People facing emergencies, such as disasters, may not receive external assistance in a timely manner, instead having to rely on themselves for critical or extended periods. A system including emergency response containers providing both for organizational structure, including a method of assigning roles to available individuals, and task domain knowledge for organizational elements, namely the people facing and experiencing the emergency, allows for organic emergency response and eases transition to and effectiveness of external professional emergency response providers. In some embodiments the system is modular and adjustable for different situations.

7 Claims, 12 Drawing Sheets

(56) References Cited

OTHER PUBLICATIONS

MobileAid Quick-Response Incident Command Kit, Web Archive, Web. Mar. 14, 2012. < https://web.archive.org/web/20120314214243/https://www.amazon.com/MobileAid-Quick-Response-Incident-Command-megaphone/dp/B004IO7M3C).*

David Scott, "On-Site Emergency Responders & Safety Personnel Can Now . . . Be the First Responder!", Nov. 23, 2009, https://www.everylifesecure.com/2009/11/onsite-emeroency-responders-safety-personnel-can-now-be-the-first-responder.html.

David Scott, "Respond with Confidence" to Any Emergency with a MobileAid Emergency Response Product Grant, Dec. 31, 2010, https://lifesecure.typepad.com/respond_with_confidence/2010/12/31/.

David Scott, "ARkStorm (California SuperStorm) Video: Preparing the Scenario Report for Emergency Responders", Jan. 19, 2011, https://lifesecure.typepad.com/respond_with_confidence/2011/01/19/.

David Scott, "New Hospital Designed for Enhanced Emergency Preparedness", Nov. 29, 2011, https://www.everylifesecure.com/mobileaid/.

David Scott, "Trauma First Aid—Get it Off Your Shoulder, Off the Wall, and Rolling on Its Way!", Jan. 19, 2009, https://www.everylifesecure.com/2009/01/trauma-first-aid-get-it-off-your-shoulder-off-the-wall-and-on-its-way.html.

* cited by examiner

Sample First Card

Since you opened this box, you are now the "Incident Commander" until someone with superior training agrees to replace you. Put on the Incident Commander Vest. Do what is explained in the cards packed with the vest. You can do this. One of the first tasks would be to enlist others to each take a stack of cards, wear the corresponding vest, and start performing the instructions in their card pack.

FIG. 6

Incident Commander Card 1

- This box will help you set up an organization to work through this incident. There are packages of cards in this container labeled with the functional area they cover and instructions on how to do the needed tasks. Find a person to take each pack, do as the pack instructs and keep in communications with you.
- Packs may include: Operations, Logistics, Planning, and Administration. An organization Chart is included on the other side of this card but some functions may have been omitted for this incident.
IC1

FIG. 7

Operations Section Chief

- You have been selected to be the Operations Section Chief until someone with superior training agrees to replace you. Put on the "Operations" vest. Do what is explained in the cards packed with the vest. You can do this. One of the first tasks would be to enlist others to help you and start performing the instructions in the "Operations" card pack.
O1

FIG. 8

Operations Card 2

- Form three groups, if possible, and designate a leader for each group
  - Fire Suppression
  - Search and Rescue
  - Medical
- Ask each leader to read and begin working on the tasks from their respective cards
- Collect three people, if possible, for you to use as runners

Fire Leader Card 1

- Set sentries for each one or two blocks to:
  - Ask each household to place any fire extinguishers they have near the curb for neighborhood use as needed.
  - Watch and report any fires
  - Repeat any reports from adjacent sentries to the next neighboring sentry
  - Help with fire suppression after reporting fire to neighboring sentry

SELF-ORGANIZING TECHNOLOGY FOR DISASTER RESPONSE AND RECOVERY

BACKGROUND

The present invention relates generally to emergency response systems, and more particularly to systems and methods for organic organized emergency response.

Current disaster preparedness plans and programs have five, or more, well-known deficiencies.

First, current emergency response capacity is not sufficient to handle the major disasters. The vast majority of current response capability depends on usable infrastructure, particularly navigable roads. Our hospitals are sized to handle day-to-day loads, not catastrophic loads, and not disasters where their own staff is personally affected as well. In seismic disasters immediate responses are required in non-medical areas such as fire control, evaluation of structural damage, freeing trapped and pinned victims, search and rescue, identifying and mitigating gas leaks, sanitation, first-aid, and the management of safe water and food resources. Medical triage and first aid would also be required. This will all happen in neighborhoods cut-off from logistics and reliable communications. People need to have methods to sustain themselves, and help themselves, until local, State and Federal emergency services are fully operational.

Second, civilians only rarely adequately prepare themselves and their homes for disasters, despite the flood of information and encouragement from the government.

Third, most immediate disaster response and recovery efforts are handled by residents in the affected area, while by far the largest investment in preparedness and response resources are for National and State responders that will move into a disaster area only days or weeks or months after a disaster.

Fourth, the typical response plan assumes the importing and implementation of a new disaster response Command & Control (C&C) system into the affected area. The locals, however, may not, and likely won't, understand the purpose, procedures, and vocabulary of responder's C&C system. On the other hand, the professional responders likely won't understand the survivor's impromptu organizational structure, vocabulary and processes. Any impromptu organizational structure may also have difficulties in formation and execution, as, for example, frictions between possible participants may result in decreased participation and/or efficiencies. These frictions may arise as there may be disagreements as to the form of organization, the contours of functional roles within the organization, and who will fill those functional roles. Further inefficiencies will also arise simply due to the time to be taken in arriving at organizational structure and roles. In addition, the members of an impromptu organization simply may not know how to respond to what to them may be a novel and unexpected situation outside the realm of their normal experience.

Finally, community social organizations are usually intact and functional after a disaster. They have tremendous value for organizing relief efforts, but are usually ignored by responders coming from the outside who wish to establish their own organizational structure.

In Los Angeles it is anticipated that an earthquake that will disrupt physical access to the affected area by damaging roads and communications infrastructure will hit California in the near future. The massive increase in demand and lack of infrastructure will overwhelm emergency services. As a result, the average resident will not have access to emergency services for up to two weeks. The CERT (Civilian Emergency Response Training) concept was developed and implemented by the City of Los Angeles Fire Department (LAFD) in 1985 to provide some basic training in disaster survival and rescue skills in order to improve the ability of citizens to survive until professional responders could arrive. They recognized that citizens would very likely be on their own during the early stages of a catastrophic disaster. CERT also recognizes that there are insufficient civilian volunteers in the case of a major disaster.

The city of Los Angeles' Civilian Emergency Response Training (CERT) program states that after a major disaster neighborhoods are expected to be on their own for up to two weeks because of damaged infrastructure and lack of resources. Should weapons of mass destruction (WMDs) ever be used, professional responders would clearly be overwhelmed and civilian volunteers would be called upon to fill the gap for immediate and short term needs. The CERT program trains a few thousand civilian volunteers per year to respond to natural disasters, but even LA's CERT officials recognize that there are insufficient trainees for a major disaster. And in any case trained civilians and first-responders would have to choose between performing their duties, teaching others, or managing neighborhood rescue efforts.

BRIEF SUMMARY OF THE INVENTION

Aspects of the invention provide a system for implementing a structured level response to an emergency. In some aspects the system includes a distribution system including discrete separable distributable items having information. In some aspects the information of the items having information is presented and/or presentable in a quantized sequence for formation of a structured organization for responding to the emergency. In some aspects the items having information are separated into items for functional units of the organization. In some aspects the items having information are grouped by a function to which each item of information relates.

One aspect of the invention provides a system for use in responding to emergencies, comprising: a plurality of card packs, each card pack defining a role in a hierarchical organization, each role relating to tasks to be performed by an individual in responding to an emergency, at least some of the tasks including a task of distributing at least one card pack to another; and a box containing the plurality of card packs.

Another aspect of the invention provides a system for use in responding to emergencies, comprising: a plurality of items having information, each of the items having information relating to a organized local response to an emergency, the information of the items of information providing information as performance of emergency related tasks; and a container for holding the plurality of items of information.

Another aspect of the invention provides a method of providing for localized response to emergency incidents, comprising: determining an area suspected to be subject to an emergency; determining a type of emergency to which the area is suspected to be subject; determining a plurality of roles for local responders to the emergency, at least one of the roles being that of an incident commander; preparing information for the conduct of each of the roles; placing the information onto items; placing the items into a plurality of containers; and placing the plurality of containers in the area suspected to be subject to the emergency.

Another aspect of the invention provides a system for use in responding to emergencies comprising a plurality of items configured to provide information relating to an organized local response to an emergency, each of the plurality of items being provisioned for a particular role within an organization configured for providing the organized local response to the emergency, and a plurality of identification items, each to identify an individual fulfilling the particular role in the organization. In some aspects the item configured to provide information is configured to receive information from a remote location, for example through wireless communications, and to provide information using the received information.

These and other aspects of the invention are more fully comprehended upon review of this disclosure.

BRIEF DESCRIPTION OF THE FIGURES

FIGS. 6-10 illustrate an example cards of a disaster response enablement system in accordance with aspects of the invention;

DETAILED DESCRIPTION

Figure 1:
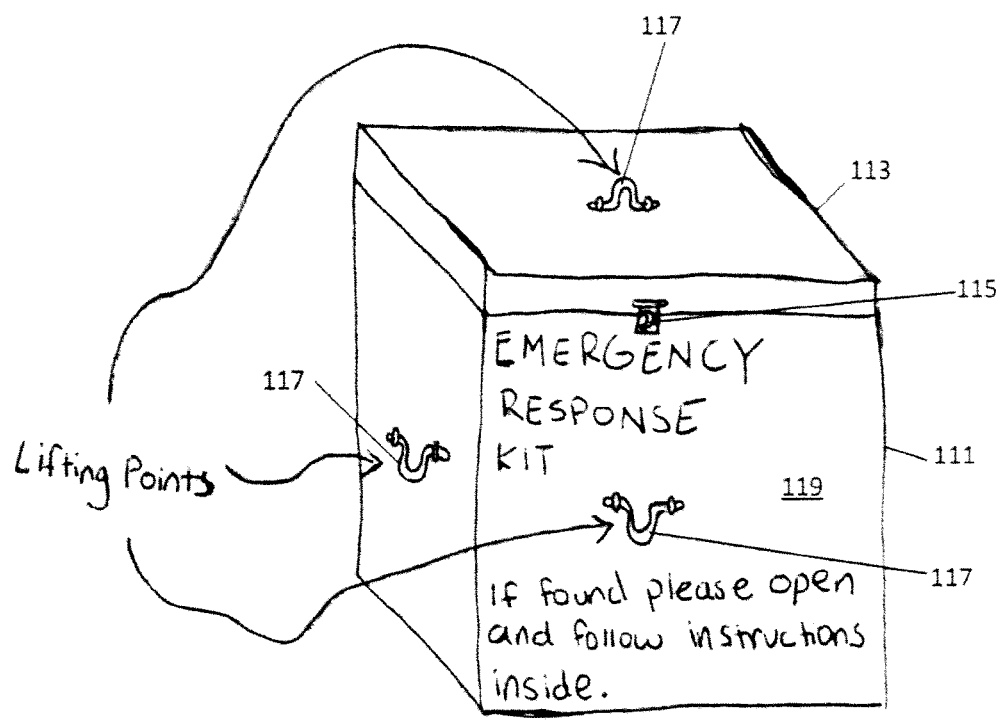
FIG. 1 illustrates a disaster response enablement system in accordance with aspects of the invention.

An embodiment of the invention provides a self-contained just-in-time management and training system in a box or box-like form. In some embodiments the system is a disaster response enablement system. In one embodiment this is a rugged box, approximately one to three foot cube, which contains items having information, with the information such that recipients of the information can be informed of emergency related tasks to undertake in a step-by-step manner. In various embodiments each item having information is separable from others of the items having information, and each item having information includes specific information for performing a particular role in an organization for responding to an emergency, including, for various roles, recruitment of additional individuals to perform subsidiary roles within the organization. Accordingly, in some embodiments the items of information define functional roles in an organization, provide information as to how to perform those functional roles, and provide information as to how to form the organization and a method of doing so in a somewhat non-contentious manner.

In some embodiments the items having information are in the form of printed material, for example printed cards, or printed scrolls, of paper, cloth, plastic, or polyester, for example Mylar. In some embodiments the items having information are audio, video, or audiovisual players, with, for example, information being stored on electronic or computer readable storage medium, non-transitory in various embodiments, of the players. The use of such players may be beneficial in that any requirement for literacy to be able to comprehend the information provided may be reduced or eliminated. In addition, some players, for example players in the form of a laptop, tablet, smartphone, or similar computer device, may be able to store and provide enhanced or reference materials to supplement or explain the information. In some embodiments the items having information comprise radio frequency (RF) or other wireless communication devices, which may include speakers and/or displays, and in some embodiments such devices may have information only in a figurative sense, with information communicated to the device at times of use or potential use.

In some embodiments the information is the information of the proven CERT manuals, with the information for example printed on weatherproof pocket-sized cards. These cards may be grouped and bound into functional packs such as "Organizing People", "Water Purification", "Sanitation", "Search Operations", "Rescue Operations", "Disaster Psychology", and "Disaster Medical Operations". In other embodiments the box contains cards particular to specific expected emergency events, for example evacuation of a building or a campus, or a lock-down of same. The information is organized and presented so that first-time readers without any previous knowledge or training in disaster responses can perform the appropriate tasks step-by-step. The card's advice would be congruent with other emergency incident policies and procedures, for example, depending on the expected emergency, the National Incident Management System, local emergency procedures, or facility emergency procedures. These boxes can be pre-deployed in a variety of locations or dropped to the users or a locality of potential users during an incident.

Also included in the boxes in some embodiments are role or function identification vests or other wearable visible indicators. The wearable visible indicators identify a role, function, or duties of the wearer in the context of an organized hierarchical response to an emergency. The wearable visible indicators are, preferably, items of clothing that may be considered "one-size-fits-all," with any one item generally wearable by a majority of the adult population or generally wearable by persons having a body size over a large range of normal adult body sizes. For example, vests, caps, scarves, or other items of clothing are often wearable by those across a range of body sizes, or are adjustable to allow for such we The items having information, in some embodiments having information, even if only temporarily in some embodiments, through reception of the information from a remote source, provide information to allow, inform, and guide untrained individuals in forming a hierarchical organization to provide local emergency response efforts, and how to perform tasks associated with positions in the organization. The information provided, in effect, provides instructions as to formation of the organization and roles and tasks to be performed by members of the organization. In various embodiments the form of the organization, the functional roles of members of the organization, and the tasks to be performed correlate to those expected to be used and/or performed by external professional responders, easing emergency response from local initially untrained responders to external professional responders. In some embodiments each item having information is specific to a particular role for a hierarchical emergency response organization, with the information of each item providing information as to how to perform the role, including how to recruit others to perform subsidiary roles. For example, a first item having information may provide instructions as to how to perform an incident commander role, and include instructions to provide others with items having information so that the others may accept and perform subsidiary roles. The items having information provided to those accepting the subsidiary roles may also include instructions to provide still further items having information to still others for further subsidiary roles.

With, for example, the items having information being cards, the first person to open the box would find a note like: "Since you opened this box, you are now the Incident Commander until someone with superior training agrees to replace you. Put on the Incident Commander Vest. Do what is explained in the cards packed with the vest. You can do this." One of the first tasks indicated by information of the cards would be to enlist others to each take a stack of cards, wear a corresponding vest, and start performing the instructions in their card pack.

Such boxes, or other holders, are an inexpensive and immediate way to delivery effective, useful, and highly visible support to the most important first responders at any disaster: the affected civilian population. The information is provided just-in-time and can be packaged with different card decks for particular disaster or emergency types and locations. The cards are preferably designed for rapid assimilation and to be immediately useful; literally right out of the box. In some embodiments the boxes, or other holders, may include audio, video, or audiovisual devices including memory storing information for a plurality of different emergencies, or including communication capabilities, for example wireless communication capabilities, for receiving such information, and possibly storing in memory, and displaying or otherwise presenting such information upon or after the occurrence of a specific emergency, for example. Such an approach may be useful in that it allows for determination of appropriate information to include close to or even after occurrence of an emergency.

FIG. 1 illustrates a disaster response enablement system in accordance with aspects of the invention. The system of FIG. 1 is in the form of a box. The box includes a large bottom 111 portion and a top 113. A clasp 115 secures the top to the bottom when the top is in a closed position. Lifting points 117, for example in the form of handles, are arranged on the top and sides of the bottom of the box. A title and instructions for a person finding the box are also on one side of the box. The title may for example indicate that the box is an emergency response kit, and the instructions for example may instruct the finder to open the box and follow the instructions therein.

Figure 2:
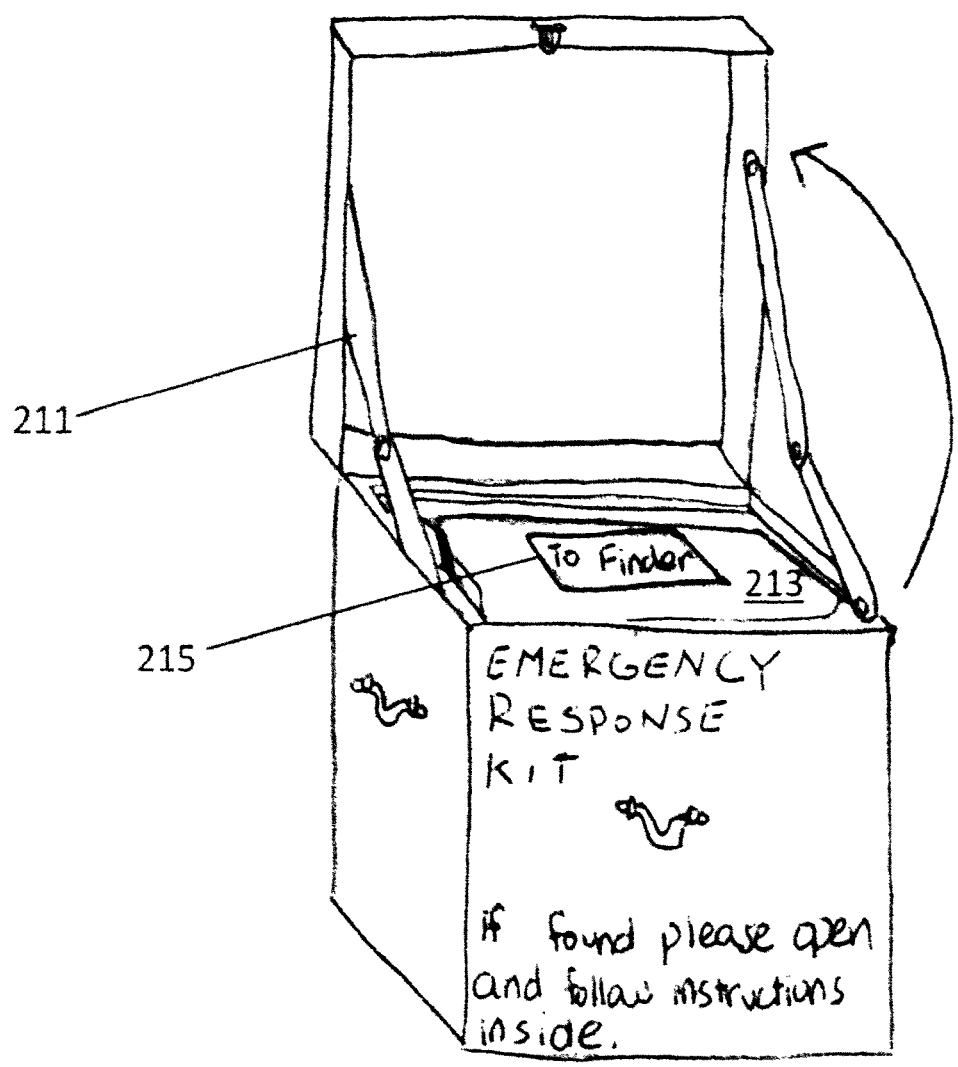
FIG. 2 illustrates a further view of the system of FIG. 1.

FIG. 2 shows the box with the top in an open position. As illustrated in FIG. 2, the top of the box is coupled to the bottom of the box by hinges 211. A tray (311 in FIG. 3) has a top 213 which may be seen about the top of the interior of the box. The tray top includes instructions for the finder of the box, with the instructions for example labeled "To Finder."

Figure 3:
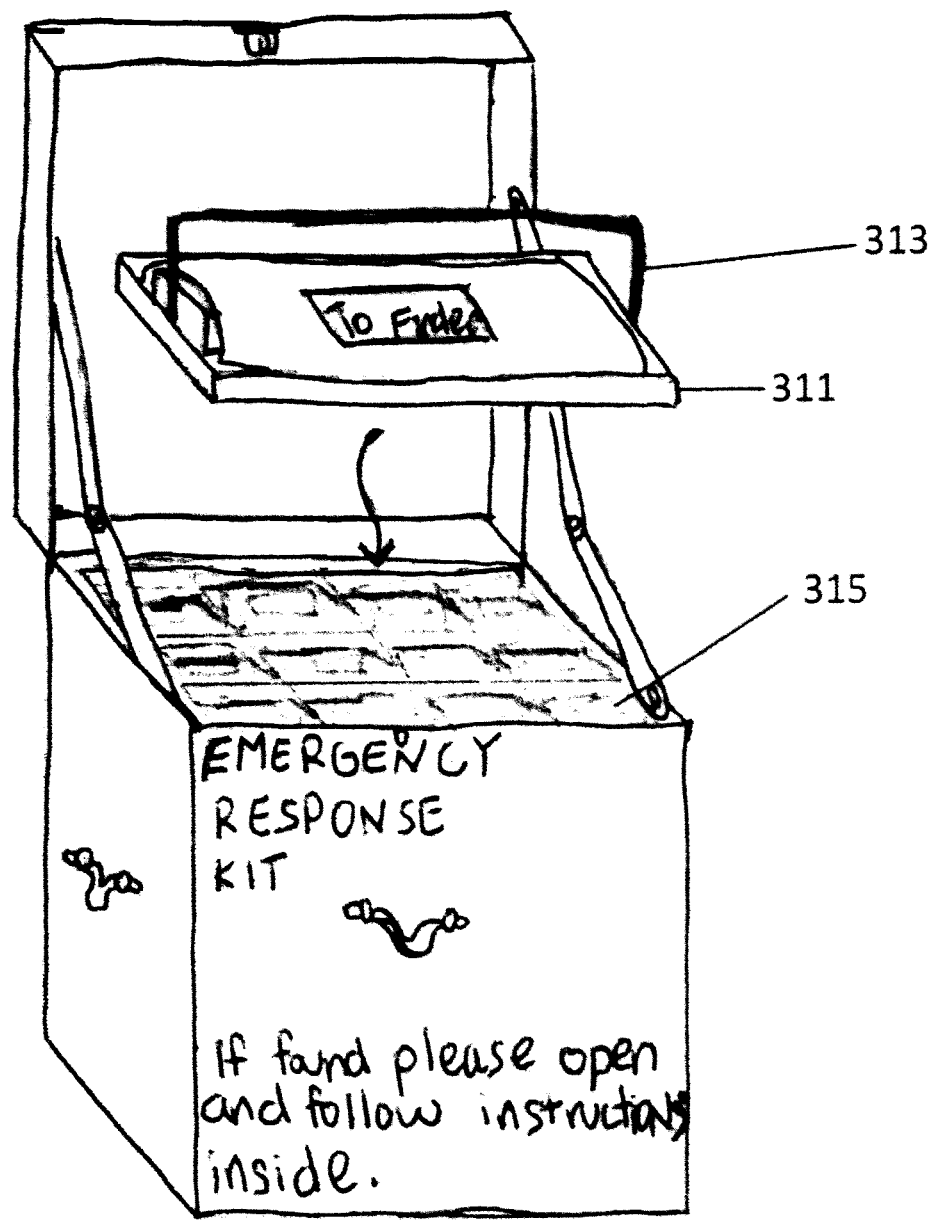
FIG. 3 illustrates a further view of the system of FIG. 1.

FIG. 3 shows the box with the tray (which may be considered a commitment barrier), raised out of the box. The tray may be raised, for example, using a handle 313 coupled to the tray. Raising the tray exposes a plurality of canisters, for example a canister 315, within the box.

Figure 4:
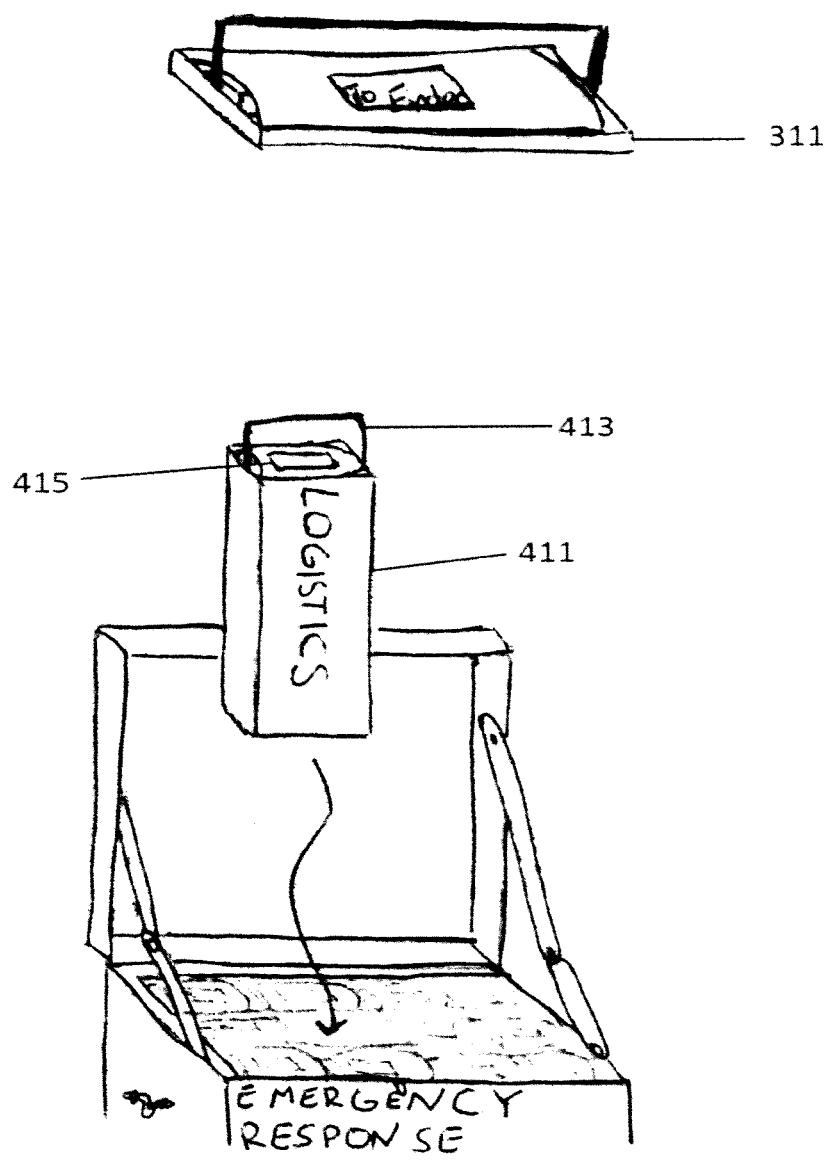
FIG. 4 illustrates a section canister of the disaster response enablement system of FIG. 1.

FIG. 4 illustrates a one of the canisters 411 raised out of the box. The canister in the embodiment of FIG. 4 is a parallelpiped, providing a convenient form-factor for storing in the larger parallelpiped of the box. The canister includes a handle 413 for ease of lifting out of the box. Also, the canister, like the tray, includes an instruction card 415 for a person selecting or being provided the canister.

Figure 5:
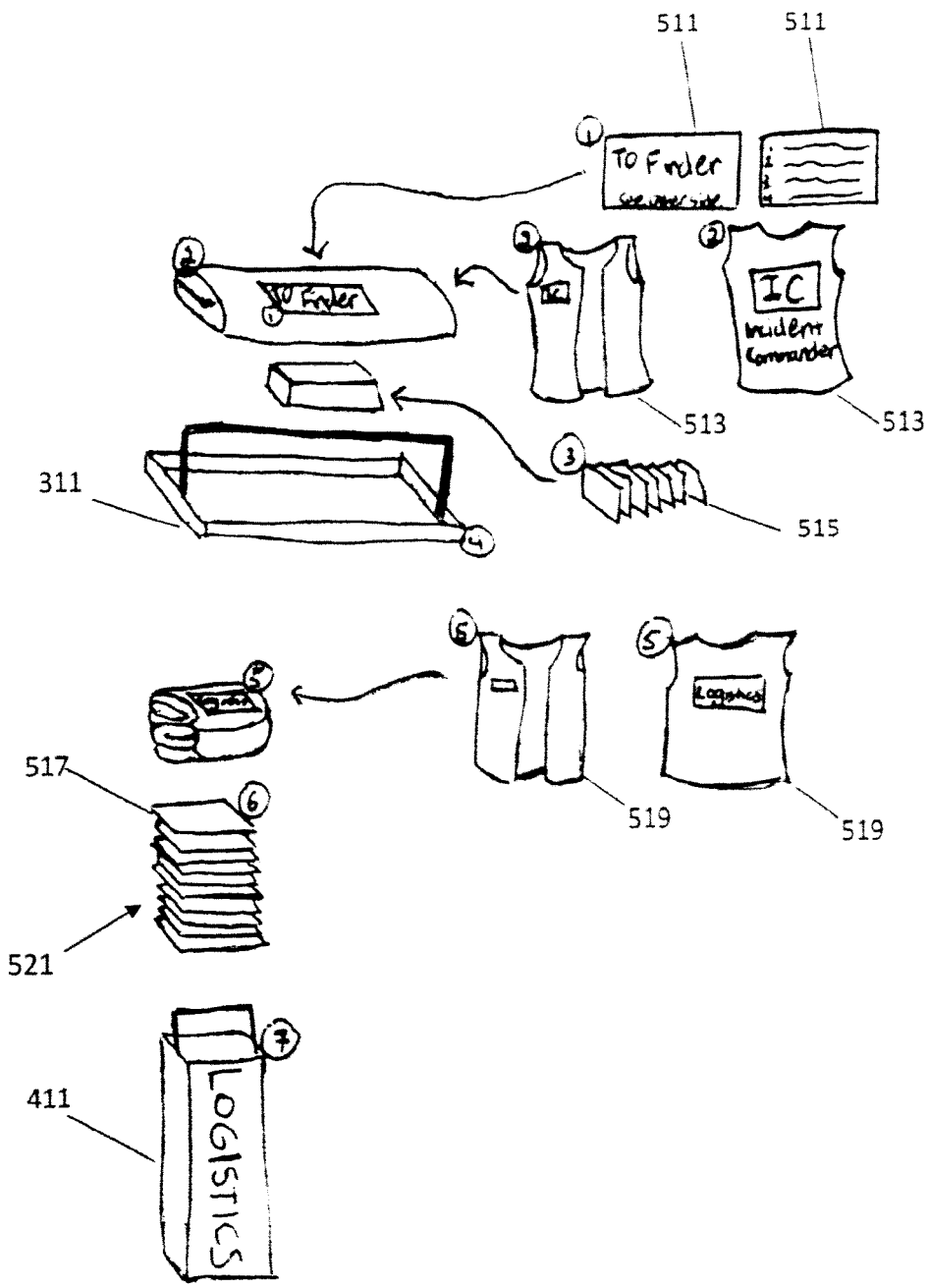
FIG. 5 illustrates example contents of the system of FIG. 1, including contents of a section canister of FIG. 4.

FIG. 5 illustrates example contents of the tray 313 of FIG. 3 and the canister 411 of FIG. 4. The tray of FIG. 2 includes a card, which may be termed an activation card 511 (with both front and back of the activation card illustrated in FIG. 5) with instructions for the finder of the box, a vest 513 (also both front and back illustrated) identifying the function of the individual for that individual to wear, and a plurality of cards 515 to help instruct the individual how to perform the functions which it is hoped the finder of the box will perform. Similarly, the canister includes a card 517 with instructions for the person selecting or being provided the canister, a vest 519 to identifying the function of the person for that person to wear, and a plurality of cards 521 to help instruct the person how to perform the functions which it is hoped the person will perform.

FIG. 6 shows text of a sample card that may be provided with the tray. The card provided with the tray provides instructions as to how to begin responding to an incident. For example, the instructions may provide instructions as to how to begin to utilize the contents of the box, the instructions may provide instructions as to the role expected of the person finding the box, and/or the instructions may provide instructions as to the duration for which the role is to be assumed. In general, the individual is an incident commander for responding to an incident, at least until another person, for example another person with equal or superior training/capability, agrees to be the incident commander, and the duties of the incident commander may include recruiting others to perform various tasks in responding to the incident.

FIG. 7 shows text of a sample card of the plurality of cards that may be provided with the tray. The sample card may, for example, provide further instructions relating to the role the individual is to play in responding to an incident. For example, the sample card may provide instructions as to how the incident commander may organize others whom the incident commander recruits to provide assistance.

FIG. 8 shows text of a sample card showing instructions for a person selected for one of the canisters, with FIG. 9 showing text of more detailed instructions for such a person. Similarly, FIG. 10 shows text of a sample card showing instructions for a further person who may assist the person selected for one of the canisters.

Figure 11:
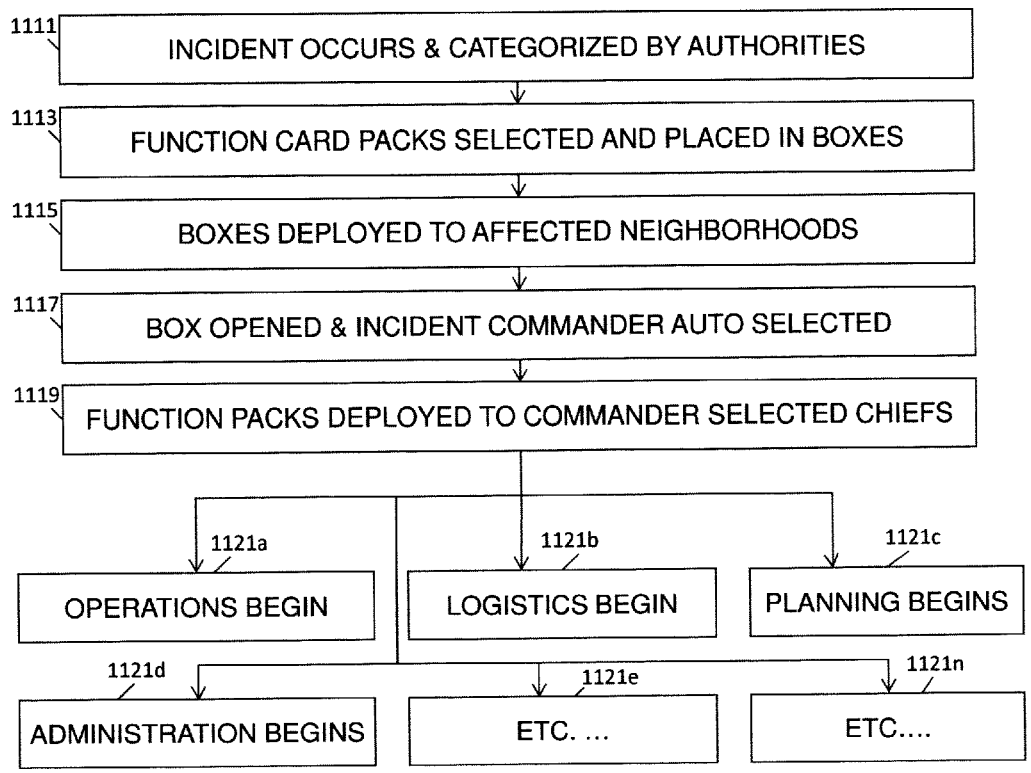
FIG. 11 is a flow chart of deployment and use of systems in accordance with aspects of the invention.

FIG. 11 is a flow diagram of an example deployment and use scenario for an incident response system in accordance with aspects of the invention. In block 1111 an incident occurs and is categorized by authorities, for example governmental or non-governmental disaster planning or response personnel. The incident, for example, may be an earthquake, a large destructive weather event, civil unrest, or other event or events severely impacting normal provision of services, particularly safety or supply related services.

In some embodiments, however, in block 1111 there may only be concern that an incident may occur. For example, there may be concern that an incident such as those discussed above may occur. Alternatively, there may be a concern that a sinking of a ship may occur, or a building may need to be evacuated due to a fire, or a variety of other possible incidents may be forseen.

In block 1113 card packs are selected and placed into disaster response enablement systems, for example the boxes previously discussed herein. The card packs include instructions for localized organized response to the incident. Different incidents may be suggestive of different responses, for example a desired response to a communicable epidemic may differ from a desired response to a hurricane or an earthquake, and card packs may vary dependent on the incident.

In block 1115 the boxes are deployed to affected locations, for example affected neighborhoods or buildings. The boxes may be deployed by, for example, helicopter, or by other means.

In block 1117 an individual may happen upon a box, either by randomly encountering the box or, perhaps more likely, by seeing the box deployed, with the individual opening the box, or possibly by being preinformed as to the location of the box and the desirability of the individual utilizing the box in the event of an incident. Assuming the individual opens the box and undertakes the duties requested by the box, the individual becomes an incident commander for the neighborhood or locality, and provides a seed of a local organized response to the incident. In block 1119 the incident commander deploys function packs, for example in the form of canisters, to other people. The function packs provide instructions for these other people to perform various functions in locally responding to the incident. In many cases the function packs themselves instruct the other people to recruit still further people to assist in responding to the incident. In blocks 1121*a-n* the various functions prescribed or suggested by the function packs begin, with the functions being performed by the other people and possibly still further people. As the still further people are, by this arrangement, in a reporting structure to the other people, and the other people are in a reporting structure to the incident commander, a local organized response to the incident may be provided.

Figure 12:
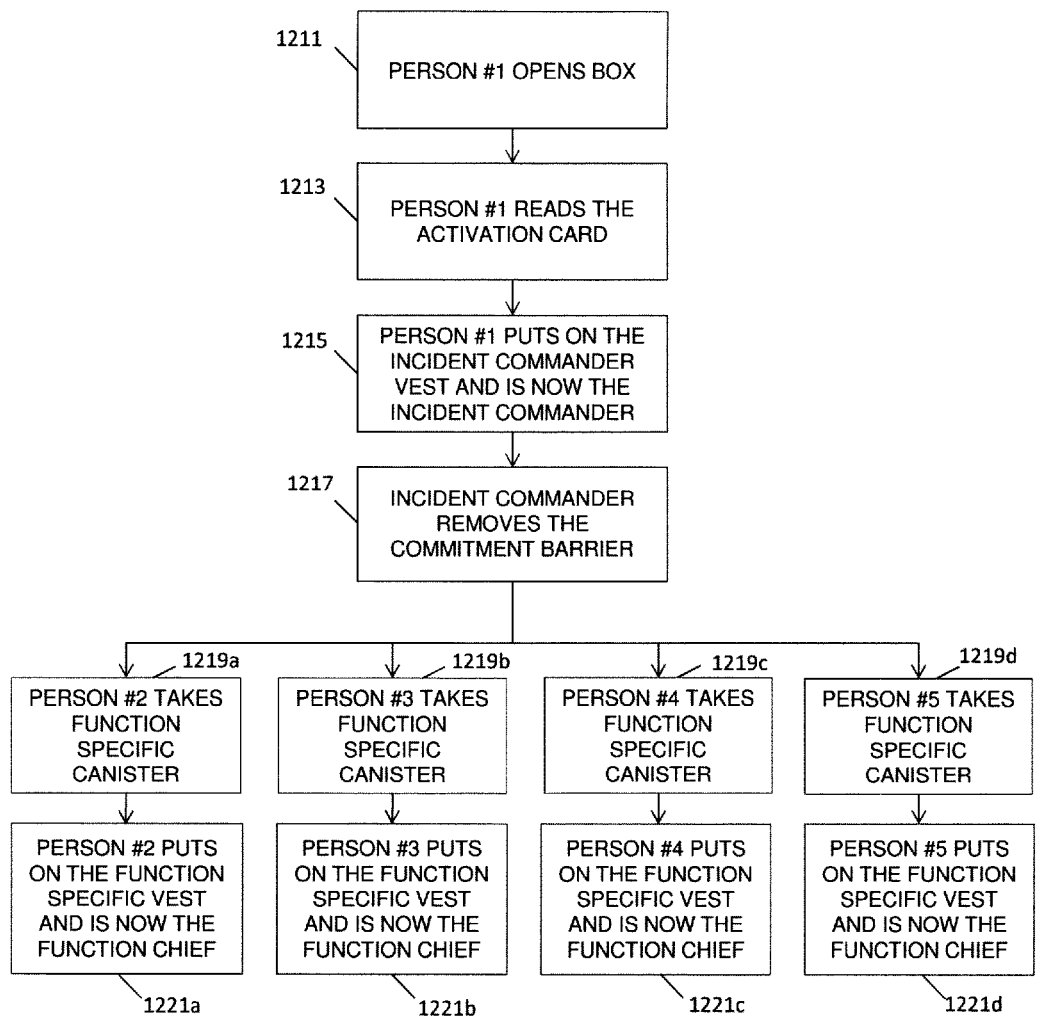
FIG. 12 is a flow chart of use of systems in accordance with aspects of the invention.

FIG. 12 is a flow diagram of a use scenario for an incident response system in accordance with aspects of the invention. The system may include, for example, a box and its contents such as discussed herein. In most embodiments the use scenario begins after an incident, for example a civil emergency as may result from an earthquake or other disaster, or a building evacuation, either as part of a drill or due to local circumstances such as a fire.

In block 1211 a first person opens the box. The first person may have come across the box through chance, or in some embodiments the box may have been specifically provided to the first person, either before an incident or after an incident.

The box includes a variety of materials, including an activation card about a top of the interior of the box. The activation card provides instructions to the first person as to begin use of the contents of the box. In block 1213 the first person reads the activation card. The activation card may, for example, include text similar to or the same as the text of the card of FIG. 6, and the card may instruct the first person to wear a vest, included in the box, identifying the first person as an incident commander, and to perform the instructions for additional cards provided in the box for the incident commander. In block 1215 the first person, following instructions of the card, puts on the incident commander vest and becomes the incident commander.

In block 1217 the first person accesses a plurality of additional packages within the box. The additional packages may be in the form of canisters, for example as previously discussed, and the canisters may be accessed by removal of a tray, or commitment barrier, blocking access to the canisters. For purposes of example, it may be assumed that the box includes four canisters, and that instructions to the incident commander include instructions for the incident commander to deploy the canisters to other people. Accordingly, in blocks 1219*a-d* first through fourth canisters are provided to, or taken by, a second person, a third person, a fourth person, and a fifth person, respectively. In blocks 1221*a-d* each of the second, third, fourth, and fifth persons puts on a function specific vest provided in their respective canister, and becomes the chief for that function, and begins to perform the tasks allotted to that function for responding to the incident.

The system applies self-organizing principals of command and control for civilian responders. The cards use the natural bottom up volunteer response to emergencies, enhanced with proven CERT or CERT type information and techniques. There is no reliance on external bureaucracies or imposed command-and-control systems. Nor is there an assumption that any pre-disaster support systems will be still functional.

The operational benefit will be faster and more effective response to national and local disasters and WMD strikes. This includes fewer post-incident casualties, better use of civilian resources, and easier integration of and communication between City, State, Federal, and Military rescue efforts and post-disaster neighborhood leadership.

Training material for civilians for a variety of disasters and incidents already exists and has been thoroughly tested with thousands of civilian volunteers in CERT training classes. Developing "drop in" decks to work for diverse cultures, languages, different incidents, and locations nationwide is a tremendous challenge. The cards must help untrained civilians work effectively in the middle of a disaster.

The boxes help mitigate all five major flaws in the current "top-down" disaster response paradigm at a small fraction the cost of those programs.

Quantitative Improvements provided in some embodiments:
- There will be more responders, acting more appropriately at disaster incidents hours or days or weeks earlier than would be the case without the system.
- There will be fewer preventable injuries to citizen responders.
- There will be fewer preventable deaths to citizens in the affected area.

Qualitative Improvements provided in some embodiments:
- The boxes work without relying on civilian preparation, training classes, previously acquired resources, or the efficient functioning of newly imposed bureaucracies and organizational structures in a disaster area.
- Citizen responders will have better information on necessary tasks. Their information will be better organized and directly actionable.
- Citizen Volunteers will be self-organized, resulting in more efficient work and less wasted effort. Their work and response will be more consistent and appropriate to each situation and disaster.
- The organically formed citizen responders will work better with professional responders in terms of information flow and transfer of responsibilities.
- Both the reality and the perception of competent immediate civilian disaster relief will improve morale and civilian resilience while reducing panic and leadership issues in the affected area. This will lessen the demands on other disaster response resources, and enable more efficient and appropriate use of professional, government, and military disaster response resources.

In some embodiments card decks, or other discrete information providing devices, could include information covering seven complete CERT manual training chapters, or information of some or all of those chapters. The relevant CERT training manual chapters may be:

Basic Disaster preparedness: Food storage, Water Storage. Water Purification, Sanitation, and Basic First Aid Fire Safety: Fire prevention, and Fire Fighting Light Search and Rescue: Situation Size-up, Search Operations, Rescue Operation, Leveraging and Cribbing Operations, and Surveying and Marking Buildings Organizing People: Assigning and Tracking People, Necessary Tasks, How to Organize and Deploy Volunteer Resources, Rescuer Safety, Documentation, and Communication Between Command Levels & Groups Disaster Psychology: Team Well Being, and Working with Survivor's Trauma.

Disaster Medical Operations I: Recognizing Life Threatening Conditions, and Triage Disaster Medical Operations II: Public Health (hygiene and sanitation), Disaster Medical Treatment Areas, Patient Evaluation, and Basic Treatment In some embodiments:

Card deck designs include designs for additional threats (e.g. W Ds), incidents (e.g. nuclear plant accidents), natural disasters (e.g. hurricanes, winter storms), and additional languages (e.g. Spanish, Chinese) not included in CERT Manuals.

Card decks are supplemented or replaced by audio, video, or audiovisual devices with information in storage, or which may have communication capabilities to receive and display or otherwise present the information, and in some embodiments store the information.

The cards preferably may be understood by the vast majority of US residents in a variety of disaster situations with no previous training. The cards preferably effective mobilize community resources in the time of a disaster.

In some embodiments card decks are based on the existing, proven content of the CERT manuals, edited and formatted for use in card decks and by users who are completely unfamiliar with the content. In some embodiments additional instructions and illustrations are used to enable out-of-the-box use without benefit of any pre-training by the responders. Physically, the boxes and the cards preferably are durable, strong, and waterproof to survive the disasters they are intended to mitigate, and impact resistant enough to be dropped from helicopters.

The boxes themselves are, in some embodiments predeployed in locations where they are both safe over a long period of time, but then immediately accessible when needed. The boxes themselves may be relatively inexpensive, thus permitted redundant copies to be placed in many locations.

Accordingly, aspects of the invention provide for local, organized disaster response. Although the invention has been described with respect to various embodiments, it should be recognized that the invention comprises the claims supported by this disclosure, and their insubstantial variations.

What is claimed is:

1. A system for use in responding to emergencies, comprising:

a plurality of canisters, each including an activation card and a set of a plurality of instruction cards, each set of the plurality of instruction cards defining a different role in a hierarchical organization, each role relating to tasks to be performed by an individual in responding to an emergency, at least some of the tasks including a task of recruitment of others to perform subsidiary roles in the hierarchical organization by way of distributing canisters to others so as to form the hierarchical organization;

wherein the plurality of canisters include an incident commander canister, the incident commander canister including an incident commander activation card and instruction cards defining tasks to be performed by an emergency incident commander, at least one of the tasks being recruitment of others to perform subsidiary roles in the hierarchical organization;

a box containing the plurality of canisters; and a removable tray, wherein the box includes the removable tray on top of the canisters other than the incident commander canister, the removable tray blocking access to the canisters other than the incident commander canister within the box, the activation card for the incident commander canister including instructions to remove the removable tray and distribute at least some of the canisters other than the incident commander canister to at least some of the others recruited to perform the subsidiary roles.

2. The system of claim 1, wherein the instruction cards include information of a civilian emergency response training manual.

3. The system of claim 1, wherein each of the canisters additionally contains at least one item of wearable visible indicators identifying a wearer as a function leader in the hierarchical organization.

4. The system of claim 3, wherein the function is that of incident commander.

5. The system of claim 3, wherein the at least one item of wearable visible indicators comprises a plurality of items of visible clothing, each of the plurality of items of wearable visible indicators identifying a function of the wearer in the hierarchical organization.

6. The system of claim 3, wherein the at least one item of wearable visible indicators comprises an item of clothing wearable over a range of body sizes.

7. The system of claim 6, wherein the at least one item of clothing comprises a vest.

* * * * *

UNITED STATES PATENT AND TRADEMARK OFFICE
CERTIFICATE OF CORRECTION

PATENT NO. : 10,332,426 B2
APPLICATION NO. : 13/523504
DATED : June 25, 2019
INVENTOR(S) : Brent A. Lowensohn Page 1 of 1

It is certified that error appears in the above-identified patent and that said Letters Patent is hereby corrected as shown below:

In the Specification

In Column 4, Line 41, delete "we" and insert --wear.--, therefor.

Signed and Sealed this
Fourteenth Day of April, 2020

Andrei Iancu
*Director of the United States Patent and Trademark Office*